Cole & McGhee,
Potato Digger.

No. 92,518. Patented July 13, 1869.

WITNESSES

INVENTORS
W. W. Cole.
T. McGhee.
pr. Attorneys

United States Patent Office.

W. W. COLE AND T. McGHEE, OF EUDORA, KANSAS.

Letters Patent No. 92,518, dated July 13, 1869.

---

IMPROVEMENT IN POTATO-DIGGERS.

---

The Schedule referred to in these Letters Patent and making part of the same.

---

*To all whom it may concern:*

Be it known that we, W. W. COLE and T. McGHEE, of Eudora, in the county of Douglas, and State of Kansas, have invented a new and improved Potato-Digger; and we do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
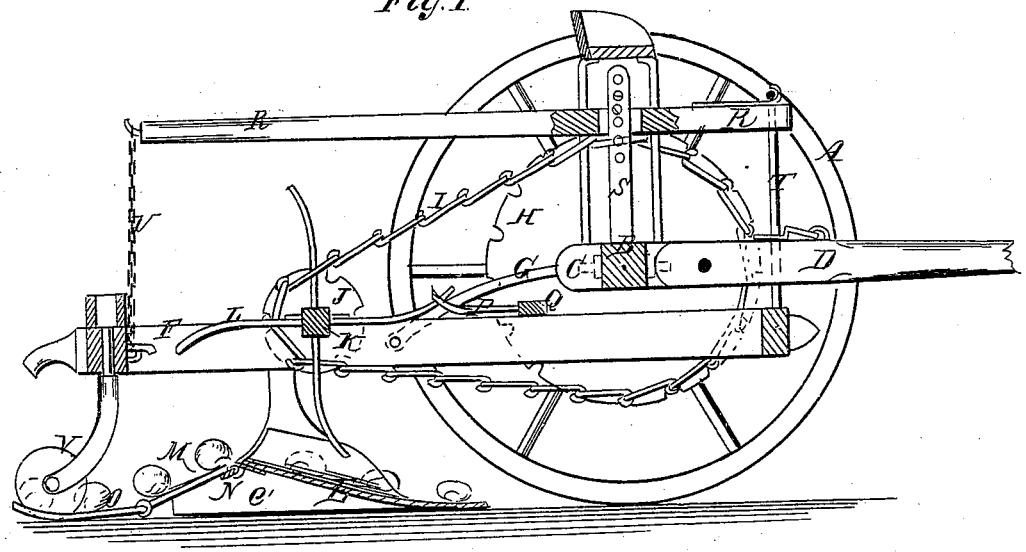
Figure 1 is a detail vertical section of our improved machine, taken through the line $x\ x$ of fig. 2.

Our invention has for its object to furnish an improved machine for digging potatoes, which shall be simple in construction, easily operated, and effective in operation; and It consists in the construction and combination of the various parts of the machine, as hereinafter more fully described.

A are the wheels, which are attached to and revolve upon the journals of the axle-tree B, in the ordinary manner.

C are the hounds, which are securely attached to the axle B, and to which the tongue D is pivoted, in the ordinary manner.

E is the plow, the plate or shovel of which is made in about the form shown in the drawings, that is to say, its forward part, which enters the ground, is made pointed or angling, as shown, and is so formed that it may be nearly in a horizontal position when working.

The rear part of the plow or plate E inclines slightly upward, and is attached at its side edges to the side plates $e'$, the lower edges of which are horizontal, and serve as landsides to the plow, and the upper parts of which serve as plow-standards, and are securely attached to the side beams of the frame F, the forward part of which passes beneath the axle B, as shown in fig. 1.

G are two bent draught-rods or bars, the rear ends of which are pivoted to the sides of the middle parts of the side beams of the frame F.

Figure 2:
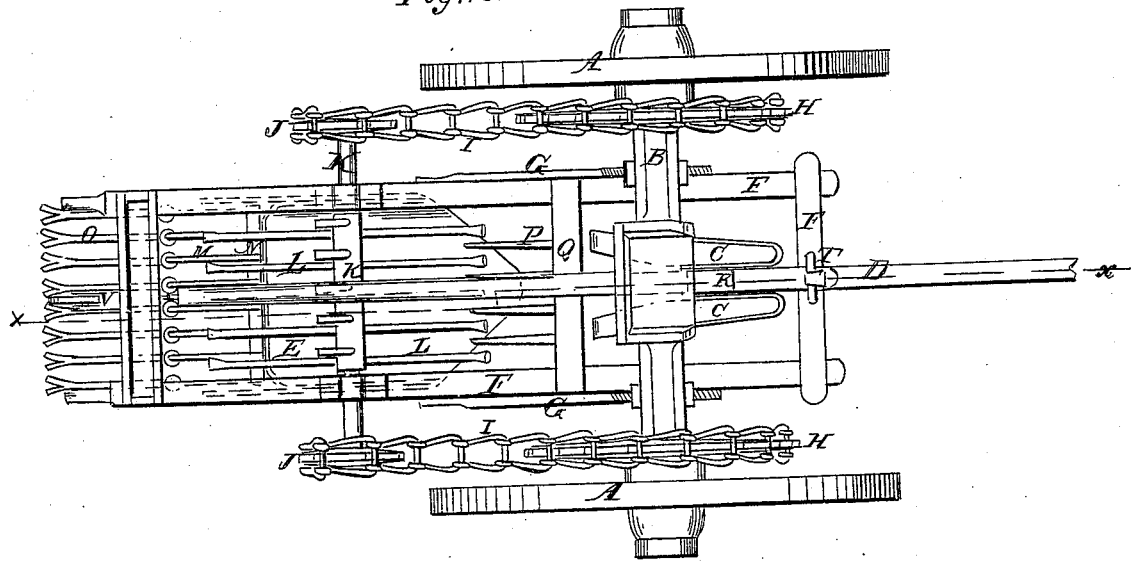
Figure 2 is a top or plan view of the same.

The forward ends of the rods G have screw-threads cut upon them, and pass through the axle B, to which they are adjustably secured by nuts placed one upon each side of the said axle B, as shown in fig 2, so that by adjusting the said nuts the axle B may be moved back or forward to tighten or slacken the endless chains.

To the inner ends of the hubs of the wheels A are securely attached gear or spur-wheels H, the teeth or spurs of which take hold of the links of the endless chains I, which pass around said wheels H, and around the gear or spur-wheels J, attached to the ends of the shaft K, so that the said shaft may be revolved by the advance of the machine.

The shaft K revolves in bearings securely attached to the side bars of the frame F, and from it project radial arms L, of such a length as to reach nearly to the plow-plate E, so as to assist the potatoes and soil as they pass up the said plate.

M are rods or arms, attached to a bar, N, pivoted to the rear edge of the plow-plate E, so that the lower ends of the bars or arms M may be drawn along the surface of the ground, thus forming an inclined rack, down which the potatoes roll, the soil raised with said potatoes passing through the spaces between the arms M.

To the lower ends of the arms M are pivoted the forward ends of the rods O, which are drawn through the ground, and the rear ends of which are forked, and turned upward, so that should any potatoes be accidentally covered with soil, they may be raised to the surface by the said rods O.

P are knives, rigidly attached to a bar, Q, the ends of which are secured to the side bars of the frame F, in such a position that the ends of the knives P may overlap the ends of the revolving fingers or arms L, to cut off any vines or stalks that may be caught and carried over by the said arms L.

R is a lever, which is adjustably pivoted to the standard S by a pin, which passes through the lever R, and through one or the other of the holes through the standard S, according to the height at which it is desired to adjust the said lever.

The lower end of the standard S is securely attached to the middle part of the axle B.

To the forward end of the lever R is attached a hook, upon which hooks the bow of the long staple or loop T, the ends of the arms of which are secured to the forward cross-bar of the frame F, so that by operating the lever R the pitch of the plow-plate E may be adjusted at pleasure, or the said plow may be raised out of the ground.

The rear end of the lever R may be connected with the rear cross-bar of the frame F by a chain, U, attached to said cross-bar, and adjustably connected with the end of the said lever R, as shown in fig. 1.

V is a caster-wheel, the upper end of the standard of which enters and works in a socket formed in the under side of the middle part of the rear cross-bar of the frame F, as shown in fig. 1.

The caster-wheel V is only used while the machine is being drawn from place to place, and is detached when the machine is being operated.

Having thus described our invention,

What we claim as new, and desire to secure by Letters Patent, is—

1. The combination of the plow E $e'$, constructed as described, frame F, and adjustable connecting-rods G, with each other, and with the axle B, substantially as herein shown and described, and for the purpose set forth.

2. The combination of the knives P and knife-bar R with the frame F and revolving fingers or arms L, substantially as herein shown and described, and for the purpose set forth.

3. The combination of the adjustable standard S, lever R, and long loop or staple T with each other, and with the axle B and frame F, substantially as herein shown and described, and for the purpose set forth.

W. W. COLE.
T. McGHEE.

Witnesses for W. W. COLE:
   O. H. BRACE,
   Z. W. BRACE.
Witnesses for T. McGHEE:
   C. KOPLEN,
   TUNRER McGHEE.